G. Hunzinger,
Extension Table.
N° 30,823.    Patented Dec. 4, 1860.
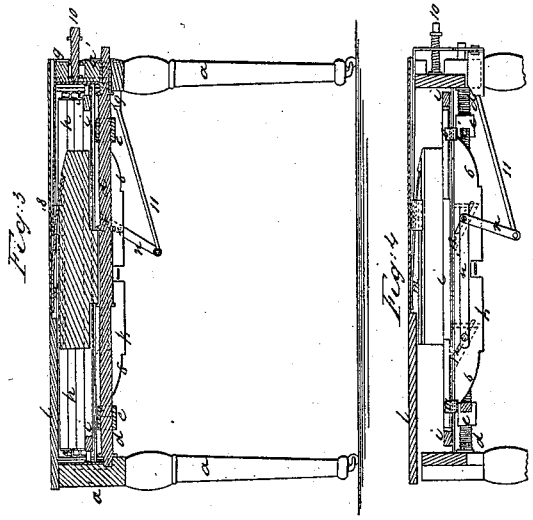
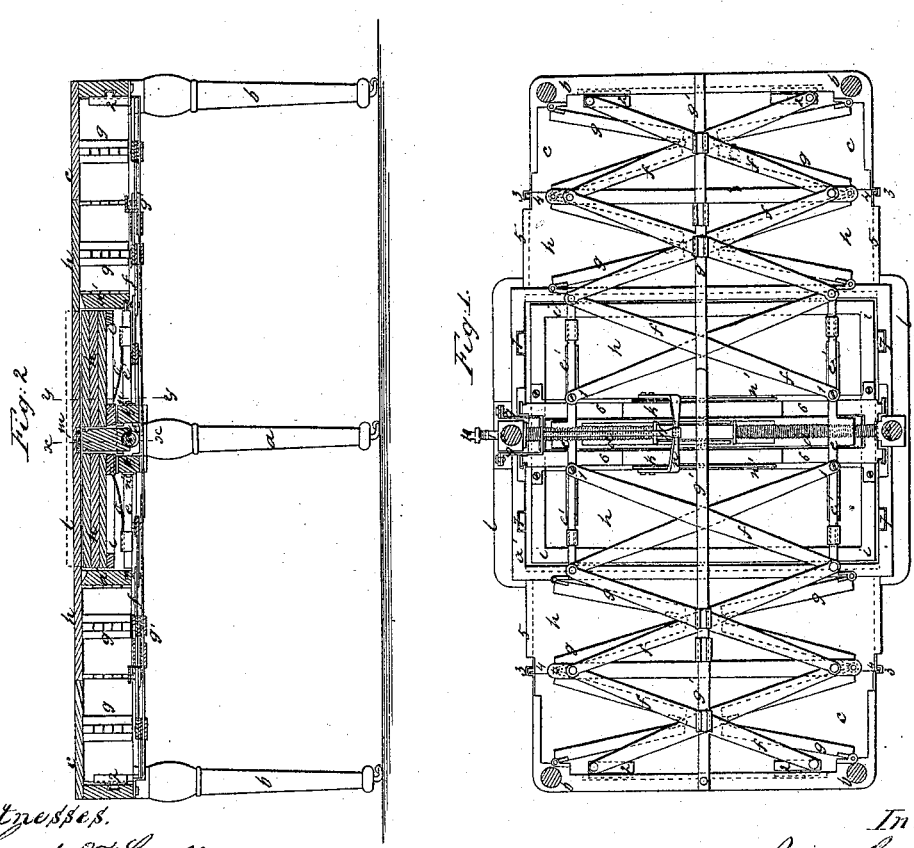
Witnesses.
Lemuel W. Serrell
Chas. H. Smith
Inventor
George Hunzinger

UNITED STATES PATENT OFFICE.

GEORGE HUNZINGER, OF BROOKLYN, NEW YORK.

EXTENSION-TABLE.

Specification of Letters Patent No. 30,823, dated December 4, 1860.

*To all whom it may concern:*

Be it known that I, GEORGE HUNZINGER, of Brooklyn, in the county of Kings and State of New York, have invented, made, and applied to use a certain new and useful Improvement in Extension-Tables; and I do hereby declare that the following is a full, clear, and exact description of the nature of said invention, reference being had to the annexed drawing, making part of this specification, wherein—

Figure 1 is an inverted plan of the table partially open. Fig. 2 is a vertical longitudinal section. Fig. 3 is a cross section at the line $x, x$, and Fig. 4 is a partial cross section at the line $y, y$, of Fig. 2.

Similar marks of reference denote the same parts.

The nature of my said invention relates to a manner of constructing extension tables, whereby the leaves are contained in the bed itself, and are drawn out by the act of extending the table or are replaced by the contrary movement, thereby the separate leaves heretofore usual in extension tables become a part of and remain in the table; instead of being packed away in a separate receptacle.

In the drawing $a, a$, are the center legs that remain in a fixed position; $b, b$, are the end legs of the table that are provided with casters, so that the two ends with the tops $c, c$, can be rolled away from or toward the center section $a$. To thus extend or contract the table I make use of the cross screw $d$, that is revolved by a movable crank applied to a square on the projecting end, and said screw is formed with right and left hand threads acting on nuts $e, e$, that extend in the form of arms $e'$ within the frame $a'$, and $f, f$, are jointed cross bars attached to $e'$, at 1, and terminating at the sliding blocks 2, 2, at the respective ends $b, b$.

$g$ $g$ are folding bed pieces to sustain the weight of the leaves $h$, and $g', g'$, are sliding bars to preserve the parallelism of the table in its movement.

The leaves $h, h$, are sustained within the frame $a'$, as hereafter indicated and the leaves as they lie horizontally one above the other are raised up as the leaves are drawn off by the extension of the table or lowered down as the leaves are replaced by the contraction of the table by the mechanism hereafter set forth. In order, however, to cause the end table tops $c, c$, to draw off the leaves I provide the hook pieces 3, 3, taking the projections 4, 4, of the next leaf, and 5, 5, are the edges of the table at the end of each leaf made to project to the line of the hooks 3, 3. As the piles of leaves $h, h$, are raised and the ends $c, c$, extended as aforesaid the hooks 3, 3, take the projections 4, 4, drawing the leaves out onto the folding bed pieces $g, g$, and when the contrary movement takes place each leaf as slid in, falling below that following, the hook pieces move on with the advancing edge of the leaf and pass from contact with the projections 4, 4, against which they had previously acted. The leaves $h, h$, as they occupy a horizontal mass one above the other in the bed $a'$, are sustained on the frames $i, i$, that are connected to the cross pieces $k, k$, near the ends of which are inclines 6, 6, curved of the proper form so that the arms $e', e'$, in drawing together and extending the table shall raise up these cross pieces $k, k$, the thickness of one leaf, during the time that the ends $c, c$, move away the width of one leaf and the reverse, so that the act of extending or contracting the table raises or lowers the piles of leaves as required to draw off, or pack back into place.

In order to cover the parts at the center of the table I make use of the leaf or top $l$, that is guided by lugs or dowels 7, 7, so that it can be slightly raised to allow the leaves to be drawn out or passed in beneath it. For this purpose I apply the spring $m$, that when released is nearly sufficient to lift the said top $l$, but when the spring is confined by sliding the clamp 8, over it said top $l$, rests with its weight on the frame $a'$. This clamp 8, is moved by a connection to the stock 9, through which the screw 10 passes to force in or draw out said clamp 8, and at the same time this movement through the rod 11, moves the swinging lever $n$, and rods $n'$, that slide the wedges 12, which are placed in mortises the cross pieces $k, k$, endwise. These wedges 12, are so fitted as to rise up under the frame $i, i$, and slightly lift the leaves upon the said frame, which movement it will be seen is simultaneous with the releasing of the spring $m$, so that not only is the weight of the center table $l$, relieved but the leaves are raised in a mass sufficient for the top ones to be drawn off as the table is extended. It is proper therefore for me here to remark that this last named operation is a prerequisite to extending or contracting the table, and that when so extended or contracted the center table $l$, is lowered by rotating the screw 10, in the contrary direction and the edges of the leaves brought tightly together by turning the screw $d$, in the direction for contracting the ends, which operations bring the whole surface of the table smooth and level.

The screws $d$ and 10 may be fitted into a projecting part of the bed $a$, so as to be out of sight, or only their ends exposed to receive the turning key or crank. The springs $o$, $o$, from the arms $e'$, tend to hold the frame $i$ down to the cross pieces $k$, $k$, or the wedges 12, 12.

Having thus described my said invention, what I claim and desire to secure by Letters Patent is—

1. Constructing the leaves of an extension table so as to slide out horizontally from the center and stationary part of the table as the ends of said table are extended substantially as specified.

2. The arrangement of the cross screw $d$, and arms $e'$, combined with the cross pieces $k$, $k$, whereby the act of extending the table elevates the leaves ready to be drawn off as set forth.

3. The arrangement of the center table top $l$, spring $m$, and wedges 12, 12, in the manner and for the purposes set forth.

4. The arrangement of the cross screw $d$, nuts $e$, $e$, and cross bars $f$, $f$, in connection with the guide bars $g'$, $g'$, that preserve the parallelism of the table in its extension or contraction as set forth.

In witness whereof I have hereunto set my signature this fifteenth day of November, 1860.

GEORGE HUNZINGER.

Witnesses:
LEMUEL W. SERRELL,
CHAS. H. SMITH.